US012710019B2

(12) United States Patent
Valleroy et al.

(10) Patent No.: US 12,710,019 B2
(45) Date of Patent: Aug. 18, 2026

(54) THRUST REVERSER COMPRISING PIVOTING DOORS AND A SLIDING REAR SHELL RING

(71) Applicant: SAFRAN NACELLES, Gonfreville-l'Orcher (FR)

(72) Inventors: Laurent Georges Valleroy, Moissy-Cramayel (FR); Romain Gardel, Moissy-Cramayel (FR); Loïc Chapelain

(73) Assignee: SAFRAN NACELLES, Gonfreville-l'Orcher (FR)

(*) Notice: Subject to any disclaimer, the term of this patent is extended or adjusted under 35 U.S.C. 154(b) by 0 days.

(21) Appl. No.: 18/556,501

(22) PCT Filed: Apr. 21, 2022

(86) PCT No.: PCT/FR2022/050751
§ 371 (c)(1),
(2) Date: Oct. 20, 2023

(87) PCT Pub. No.: WO2022/223929
PCT Pub. Date: Oct. 27, 2022

(65) Prior Publication Data

US 2024/0200507 A1 Jun. 20, 2024

(30) Foreign Application Priority Data

Apr. 21, 2021 (FR) ..................................... 21 04167

(51) Int. Cl.

| | |
|---|---|
| ***F02K 1/60*** | (2006.01) |
| ***F02K 1/76*** | (2006.01) |
| *F02K 1/70* | (2006.01) |

(52) U.S. Cl.
CPC ................ *F02K 1/60* (2013.01); *F02K 1/763* (2013.01); *F02K 1/70* (2013.01)

(58) Field of Classification Search
CPC ... F02K 1/60; F02K 1/763; F02K 1/70; F02K 1/58
See application file for complete search history.

(56) References Cited

U.S. PATENT DOCUMENTS 5,392,991 A * 2/1995 Gatti ......................... F02K 1/60 239/265.29
5,722,231 A * 3/1998 Porte ......................... F02K 1/70 239/265.29
5,765,362 A * 6/1998 Gonidec .................. F02K 1/68 239/265.29

(Continued)

FOREIGN PATENT DOCUMENTS

| | | |
|---|---|---|
| EP | 3 354 577 A1 | 8/2018 |
| FR | 2 486 153 A1 | 1/1982 |

(Continued)

OTHER PUBLICATIONS

International Search Report issued Sep. 6, 2022 in PCT/FR2022/050751, filed on Apr. 21, 2022, 2 pages.

*Primary Examiner* — Katheryn A Malatek
(74) *Attorney, Agent, or Firm* — Oblon, McClelland, Maier & Neustadt, L.L.P.

(57) ABSTRACT

A thrust reverser including doors, a rear shell ring and an actuation system for synchronising the pivoting of the doors and the translation of the rear shell ring.

10 Claims, 6 Drawing Sheets

(56) References Cited

U.S. PATENT DOCUMENTS

| | | | | |
|---|---|---|---|---|
| 2019/0162136 | A1 | 5/2019 | Lacko | |
| 2021/0301760 | A1 * | 9/2021 | Sutterfield | F02K 1/62 |

FOREIGN PATENT DOCUMENTS

| | | | |
|---|---|---|---|
| FR | 2 764 643 | A1 | 12/1998 |
| FR | 2 970 520 | A1 | 7/2012 |
| FR | 3 019 591 | A1 | 10/2015 |
| FR | 3 022 220 | A1 | 12/2015 |

* cited by examiner

THRUST REVERSER COMPRISING PIVOTING DOORS AND A SLIDING REAR SHELL RING

TECHNICAL FIELD

The invention relates to the field of thrust reversers for aircraft propulsion units.

The invention relates more specifically to the field of thrust reversers with pivoting doors comprising a rear shell ring.

PRIOR ART

Conventionally, the rear shell ring of a reverser with pivoting doors forms a trailing edge delimiting an exit section provided to be traversed by an exhaust flow when the doors are closed, in order to generate a thrust.

Such a reverser comprises longitudinal girders whereon the doors are hinged, in order to be able to pivot them between closed and open positions, opening them making it possible to redirect the exhaust flow to the front in order to generate a counter-thrust.

The rear shell ring can be fixed, such as for example in the reversers described in documents FR3019591A1 and FR2970520A1, or movable, such as for example in the reversers described in documents FR2486153A1, FR2764643A1 and US20190162136A1.

A fixed rear shell ring such as that of the reverser of document FR2970520A1 applies various constraints to prevent the doors colliding with it during their opening.

A first constraint relates to the distance between the axis of rotation of the doors and their rear which must be minimised. Each door being connected to the girders by pivot links, this requires reducing the circumferential distance between these linking points, giving rise to a relatively large circumferential dimension of the girders and a relatively small circumferential dimension of the doors. This results in a reduction in the thrust reversal performances and an increase in the mass of the reverser.

A second constraint relates to limiting the opening angle of the doors and therefore the usable counter-thrust flow cross-section. Satisfactory performances can be obtained by increasing the length of the doors and the nacelle accordingly, which however increases the mass of the propulsion unit.

Furthermore, in a propulsion unit comprising an internal structure such as a fairing element of the gas generator or an exhaust cone passing through the reverser, the rear end of the doors conventionally has a "swallowtail" geometry allowing them to mould the contours of such an internal structure when they are open. However, such a door geometry can prove to be difficult to reconcile with a fixed rear shell ring in kinematic terms. Conventional movable rear shell ring reversers make it possible to remedy such drawbacks but have others.

In particular, in the reverser of document FR2486153A1, the pivoting of the doors results from the sliding of the rear shell ring under the action of tie rods connecting the doors to the rear shell ring, which requires a structural and therefore bulky rear shell ring. Furthermore, the fairing elements of these tie rods increase the drag in flight.

In the reverser of document FR2764643A1, the doors and the rear shell ring are moved by independent actuators forming a complex and bulky actuation and control system.

In the reverser of document US20190162136A1, the rear shell ring is driven in translation via an intermediate structure forming a particularly complex and bulky actuation system.

DISCLOSURE OF THE INVENTION

The aim of the invention is that of providing a thrust reverser with pivoting doors with rear shell ring making it possible to remedy all or some of the drawbacks described above and particularly of simplifying the actuation system while reducing the mass of the reverser.

The aim of the invention is also that of providing a thrust reverser having good performances both in the reverse thrust configuration and in the direct thrust configuration.

To this end, one object of the invention is a thrust reverser for an aircraft propulsion unit, comprising a fixed structure, a door, a ring forming a trailing edge and intended to be traversed by a fluid flow when the reverser is in a direct thrust configuration, an actuation system configured to simultaneously pivot the door between a closed direct thrust position and an open reverse thrust position and translate the ring between a forward position and a retracted position in relation to the fixed structure, and means for guiding the ring between the forward and retracted positions. The actuation system comprises:

- an actuator provided with a movable drive element,
- a first tie rod having a first end connected to the movable element of the actuator and a second end connected to the door,
- a second tie rod having a first end connected to the movable element of the actuator and a second end connected to the ring.

According to the invention, the second end of the second tie rod is connected to the ring.

The invention thus makes it possible to synchronise the movement of the door and the ring using an actuation system that is simple, non-bulky and having a reduced mass at the same time.

The invention also makes it possible to simply the load pathways in the different parts of the reverser, particularly when it changes configuration.

The invention furthermore makes it possible to relieve the ring of any structural function and thus reduce its mass and that of the reverser, the ring optionally fulfilling merely a fluid flow guiding function in the direct thrust configuration.

Furthermore, the invention makes it possible to house the actuation system so as to reduce surface discontinuities and thus enhance performances in flight, when the reverser is in the direct thrust configuration.

In an embodiment, the second end of the second tie rod is hinged on the ring, for example using a pivot link.

Alternatively, the second end of the second tie rod can be directly connected to the ring by any other link, for example a fixed link.

Preferably, the fixed structure comprises two longitudinal girders, the door extending circumferentially between these girders when it is in the closed position.

In an embodiment, the actuator is mounted on one of the girders.

Preferably, the girders comprise a rear end whereon the ring bears when the latter is in the forward position.

The reverser preferably comprises a sealing element inserted between the rear end of the girders and the ring when the latter is in the forward position.

Alternatively, the ring can bear directly on the rear end of the girders when the ring is in the forward position.

In one embodiment, the guiding means comprise bars rigidly connected to the ring and bearings borne by the fixed structure, the bars being configured to slide in the bearings when the ring is moved between the forward and retracted positions.

In one embodiment, the door comprises a rear end defining a parabolic shaped opening intended to conform with an internal structure of the propulsion unit when the door is in the open position, the reverser comprising a fairing element rigidly connected to the ring and having a complementary shape to that of said opening so as to seal it when the door is in the closed position.

In one embodiment, the movable element of the actuator comprises a carriage, the first end of the first tie rod and the first end of the second tie rod being connected to this carriage.

In one embodiment, the door comprises a locking pin configured to extend facing a stop surface formed by the ring or by a member rigidly connected to the ring when the door is in the closed position so as to prevent a translation of the ring to the retracted position.

Within the scope of this embodiment, said member rigidly connected to the ring can form an element of said guiding means of the ring.

According to one alternative embodiment, the ring can be substituted or formed by several ring sectors.

Another object of the invention is an aircraft propulsion unit, comprising a thrust reverser as defined hereinabove.

In one embodiment, the propulsion unit comprises an internal structure such as an exhaust cone, or such as a fairing element of a gas generator of the propulsion unit and/or of radially inward delimitation of a secondary flow path.

In one embodiment, the propulsion unit comprises a turbine engine such as a single-flow jet or turbofan engine.

Another object of the invention is an aircraft comprising such a propulsion unit.

In one embodiment, the aircraft is a supersonic airplane.

Other advantages and features of the invention will appear upon reading the detailed, non-limiting description that follows.

BRIEF DESCRIPTION OF THE DRAWINGS

The following detailed description refers to the accompanying drawings in which.

DETAILED DESCRIPTION OF SOME EMBODIMENTS

Figure 1:
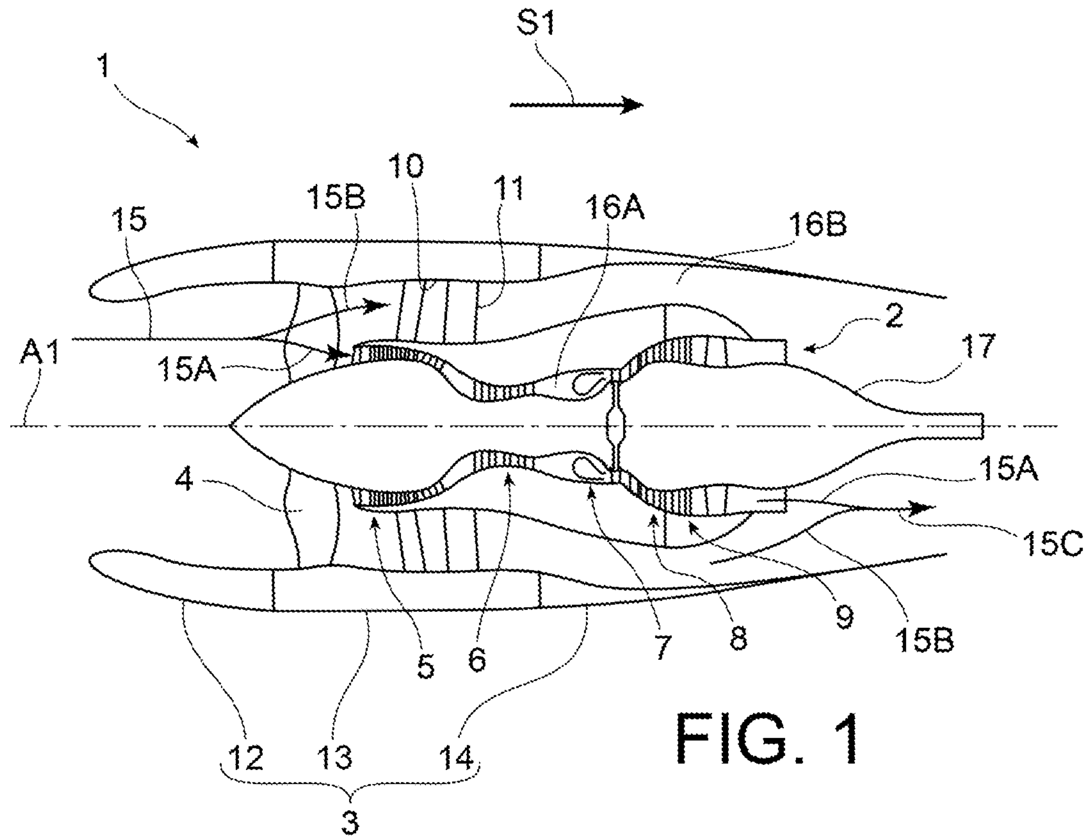
FIG. 1 is a schematic sectional view of an aircraft propulsion unit.

In FIG. 1, a propulsion unit 1 for an aircraft (not shown) having a longitudinal central axis A1 is represented.

Hereinafter, the terms “front” and “rear” are defined with respect to a direction S1 of main gas flow through the propulsion unit 1 along the longitudinal central axis A1 when it generates a thrust.

The propulsion unit 1 comprises a turbine engine 2 and a nacelle 3.

In this example, the turbine engine 2 is a turbofan engine comprising, from front to rear, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

The turbofan engine 2 is provided with a fan casing 10 connected to the gas generator by structural arms 11.

The nacelle 3 comprises a front section forming an air inlet 12, a median section which includes fan cowls 13 covering the fan casing 10 and a rear section 14.

In operation, an air flow 15 enters the propulsion unit 1 through the air inlet 12, passes through the fan 4 and then splits into a central primary flow 15A and a secondary flow 15B. The primary flow 15A flows in a primary gas flow path 16A passing through the gas generator. The secondary flow 15B flows in a secondary flow path 16B surrounding the gas generator and delimited radially outwards by the nacelle 3. At the outlet of the primary flow path 16A, the primary 15A and secondary 15B flows combine to form an exhaust flow 15C for generating a thrust.

The propulsion unit 1 is in this example equipped with an exhaust system comprising an exhaust cone 17, in order to optimise the flow of the exhaust flow 15C and reduce the noise generated by the turbofan engine 2.

Figure 2:
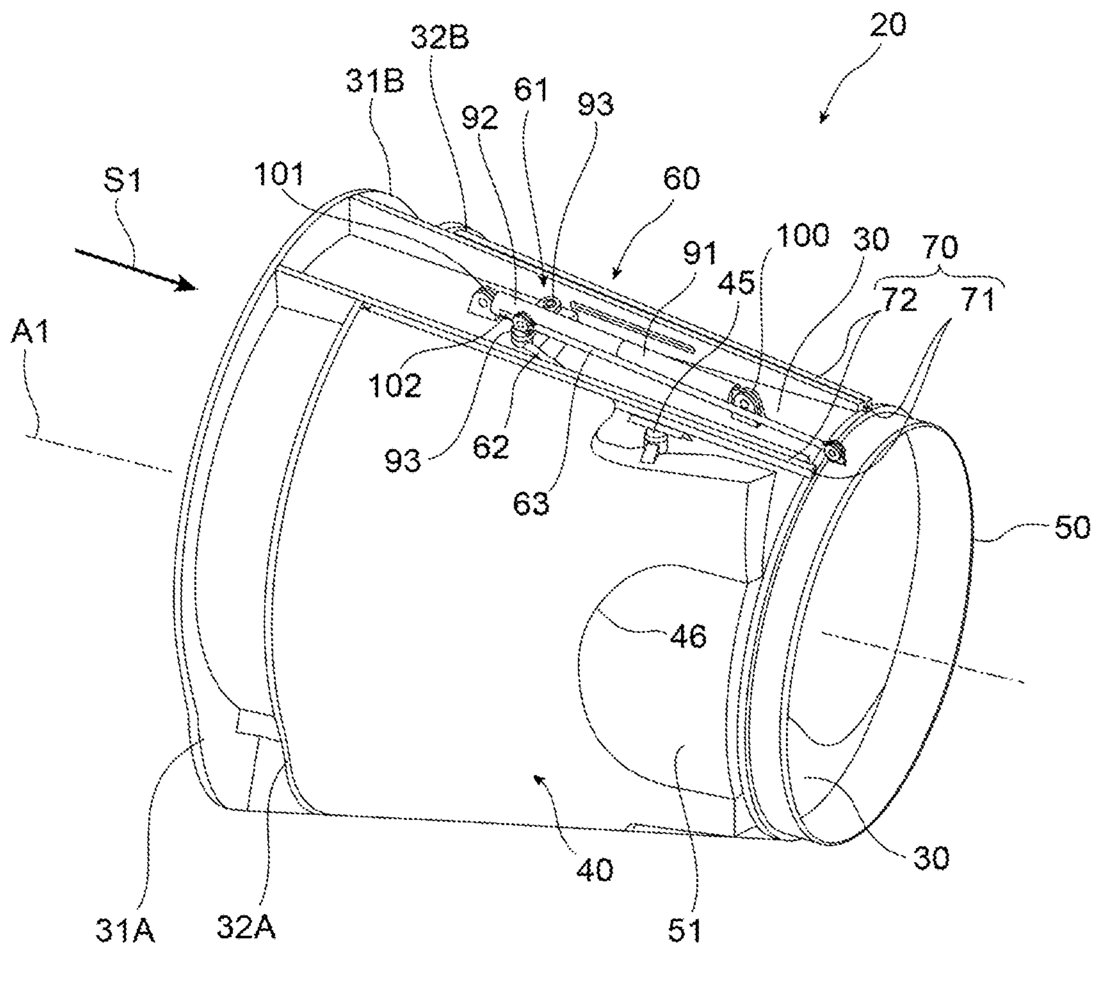
FIG. 2 is a schematic perspective view of a thrust reverser according to the invention, in the direct thrust configuration, comprising an actuator according to the first embodiment and a first type of locking means.
Figure 3:
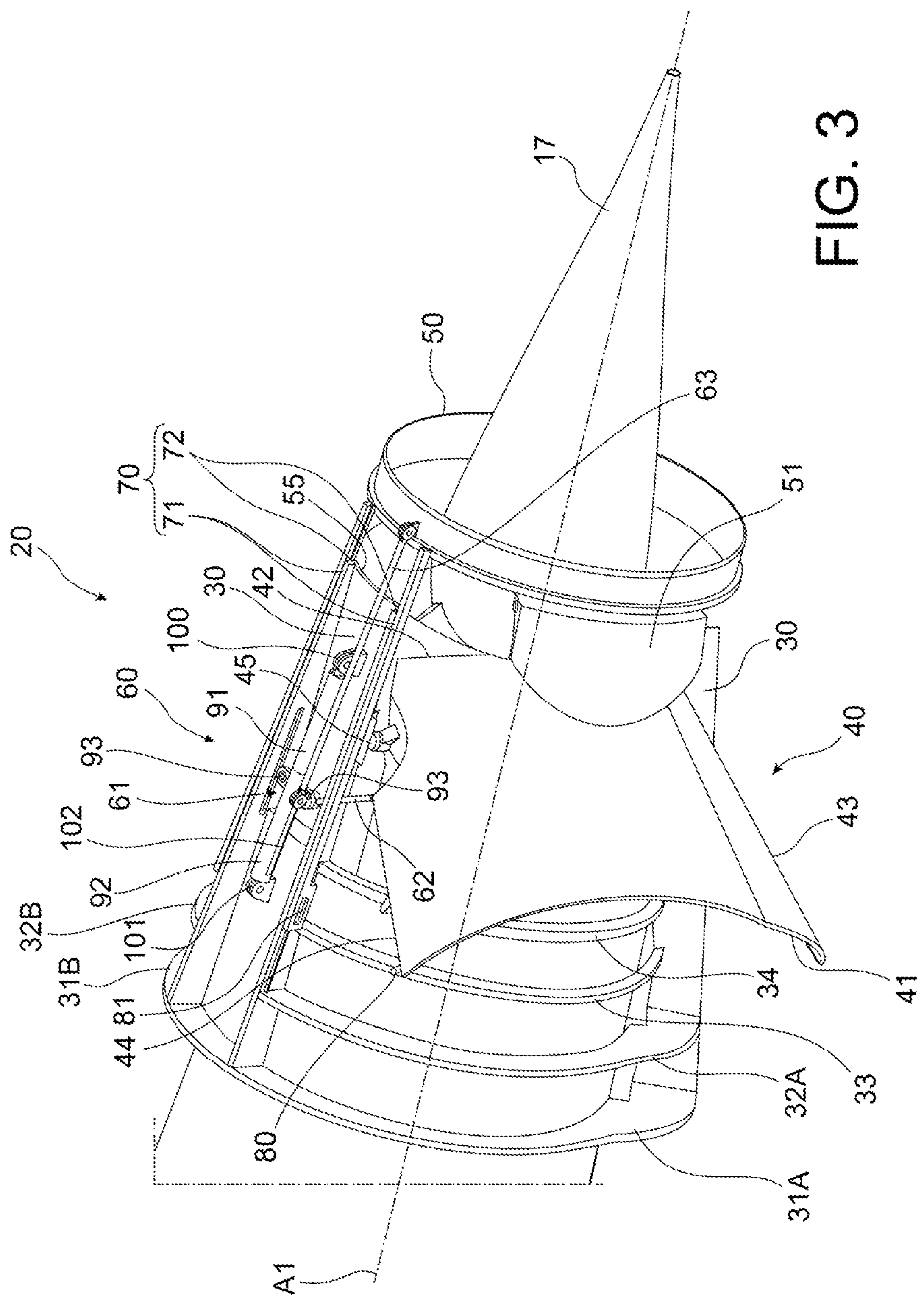
FIG. 3 is a schematic perspective view of the reverser of FIG. 2, in the reverse thrust configuration.

In this example, the rear section 14 of the nacelle 3 comprises a thrust reverser 20 such as that illustrated in FIGS. 2 and 3, in order to be able to redirect towards the front of the propulsion unit 1 a part of the mixed flow 15C and thus generate a counter-thrust.

FIGS. 2 and 3 show the reverser 20 respectively in the direct thrust configuration, allowing the propulsion unit 1 to generate a thrust with the exhaust flow 15C, and in the reverse thrust configuration, allowing generation of a counter-thrust with the exhaust flow 15C.

The reverser 20 comprises a fixed structure and a movable structure relative to the fixed structure.

The fixed structure comprises in this example two longitudinal girders 30 each extending along the axis A1 and which are circumferentially spaced apart so as to define between them two circumferential openings of identical size.

The fixed structure comprises ring sectors 31A, 31B, 32A, 32B, 33 and 34 which are rigidly connected to the two girders 30 so as to connect them to one another in order to stiffen the fixed structure of the reverser 20 and withstand the loads to which they are subjected, particularly during its change of configuration.

In this example, the sectors 31A and 32A extend through one of said circumferential openings defined by the girders 30 and the sectors 31B and 32B extend through the other circumferential opening defined by the girders 30. The sectors 33 and 34 each extend through the two circumferential openings by passing radially inwards through a first of the girders 30, in this case that located to the bottom of FIG. 3.

Each of the pairs of sectors 31A and 31B, on one hand, and 32A and 32B, on the other, form with the girders 30 an overall annular frame. The sectors 33 and 34 each form separately an overall annular frame with the second of the girders 30, located to the top of FIG. 3.

These different frames are regularly spaced apart along the axis A1.

In this example, the sectors 31A and 31B form a front frame of the reverser 20 making it possible to fasten it to a rear frame (not shown) of said median section of the nacelle 3.

Obviously, the number, arrangement and geometry of the ring sectors and/or of any other structural element of the fixed structure can be adapted according in particular to the dimensions of the reverser 20 without leaving the scope of the invention.

In respect of the movable structure of the reverser 20 of FIGS. 2 and 3, this structure comprises two doors 40, a single door being represented in these figures. The following description of the door 40 applies by analogy to the door not shown.

With reference to FIG. 3, the door 40 comprises a front end 41, a rear end 42 and two lateral edges 43 and 44.

The door 40 is hinged on the girders 30 by pivot link type linking means 45 connected at each of the lateral edges 43 and 44 so as to define pivoting axis of the door 40 between a closed position illustrated in FIG. 2 and an open position illustrated in FIG. 3.

The pivoting axis passes in this example through a substantially perpendicular plane to the axis A1.

In the closed position (FIG. 2), each of the lateral edges 43 and 44 of the door 40 runs along one of the respective girders 30 such that the door 40 seals one of the circumferential openings defined by the girders 30.

The door 40 thus extends circumferentially between the girders 30.

In this example, the front end 41 of the door 40 in the closed position runs along the ring sector 32A and an internal surface of the door 40 bears on the ring sectors 33 and 34.

The rear end 42 of the door 40 of FIGS. 2 and 3 has a "swallowtail" geometry, i.e. in particular a parabolic shaped opening 46, such that, in the open position of FIG. 3, the rear end 42 moulds the contour of the exhaust cone 17.

The movable structure of the reverser 20 also comprises a rear shell ring formed in this example by a ring 50 and by two fairing elements 51, a single fairing element being represented in FIGS. 2 and 3. The following description of the fairing element 51 applies by analogy to the other fairing element not shown.

The fairing element 51 is rigidly connected to the ring 50 and has a complementary shape to that of the opening 46 of the door 40 so as to seal it when the door 40 is in the closed position (FIG. 2).

In this example, the ring 50 forms a trailing edge and defines an exit section of the propulsion unit 1 through which the exhaust flow 15C passes when the reverser 20 is in the direct thrust configuration.

The rear shell ring— and hence the ring 50— is movable in translation along the axis A1, relative to the fixed structure of the reverser 20, between a forward position illustrated in FIG. 2 and a retracted position illustrated in FIG. 3.

In the forward position (FIG. 2), the ring 50 bears on, or at least rests against, a rear end 55 (see FIG. 3) of the girders 30. In this example, a sealing element (not shown) is inserted between the ring 50 and the rear end 55 of the girders 30.

In the retracted position (FIG. 3), the ring 50 is longitudinally distant from this rear end 55.

In this example, the ring 50 extends to the rear of the door 40 and the girders 30 regardless of the configuration of the reverser 20.

According to the invention, the reverser 20 comprises an actuation system for synchronising the movement of the doors 40 between the closed and open positions and of the ring 50 between the forward and retracted positions.

In this example, the actuation system comprises two actuators 60 each mounted on one of the respective girders 30 and, for each actuator 60, movement transmission means. The following description relates to the single actuator 60 represented in FIGS. 2 and 3 and to the corresponding movement transmission means.

The actuator 60 is in this example a linear actuator comprising a double-acting hydraulic cylinder.

With reference to FIGS. 2 and 3, the cylinder comprises a body 91 having a rear end 100 hinged on the corresponding girder 30, a tube 92 extending the body 91 from its front end, a rod (not shown) extending in the tube 92 and being guided thereby during its movement and two lugs 93 rigidly connected to the rod.

The tube 92 forms a front end 101 of the cylinder hinged on the girder 30.

The rod and the lugs 93 form a movable drive element 61, which is movable relative to the body 91 and to the tube 92, in translation along an actuation axis which is in this example slightly oblique relative to the axis A1.

The tube 92 comprises two longitudinal grooves 102 through which the lugs 93 can slide during the movement of the movable element 61.

The tube 92 makes it possible to limit the torsion of the rod account for the load dissymmetries.

The movement transmission means associated with this actuator 60 comprise in this example two first tie rods 62, of which only one is represented in FIGS. 2 and 3, as well as a second tie rod 63.

A first end of each of the tie rods 62 and 63 is connected to one of the lugs 93 of the movable element 61 of the actuator 60.

A second end of the first tie rod 62 is connected to the door 40, at the lateral edge 44 of this door 40. Symmetrically, the first tie rod not shown in FIGS. 2 and 3 is connected according to the same principle to the door not shown in these figures by its second end and to the other lug 93 by its first end.

In respect of the second tie rod 63, a second end thereof is directly connected to the ring 50.

The expression "directly" obviously does not exclude the case where the second end of the second tie rod 63 is connected to the ring 50 by a connection element (not shown) such as an end fitting.

In this example, the first tie rods 62 are connected to the movable element 61 of the actuator 60 and to the doors 40 along hinged links such that a translation of the movable element 61 along the actuation axis drives at the same time a translation of the tie rods 62 along this actuation axis and their rotation about an axis defined by the corresponding hinged link which connects them to the movable element 61.

The first tie rods 62 thus drive a pivoting of the doors 40 about their respective pivoting axis, under the action of a translation of the movable element 61 of the actuator 60.

In this example, the second tie rod 63 is also connected to the movable element 61 of the actuator 60 and to the ring 50 along hinged links.

In one embodiment not shown, for example wherein the actuation axis is parallel with the axis A1, the second tie rod 63 can be fixedly connected to the movable element 61 and/or to the ring 50.

The second tie rod 63 drives the ring 50 along the axis A1 under the action of a translation of the movable element 61 of the actuator 60 along the actuation axis.

The above description applies by analogy to the second actuator not represented in FIGS. 2 and 3 and to the corresponding movement transmission means.

Thus, each door 40 of the reverser 20 can be moved between the closed (FIG. 2) and open (FIG. 3) positions under the simultaneous action of the two actuators 60 via two of said respective first tie rods 62 each connected by their first end to one of the respective actuators 60.

Similarly, the ring 50 can thus be simultaneously moved between the forward (FIG. 2) and retracted (FIG. 3) positions under the simultaneous action of the two actuators 60 via the two second tie rods 63 which are each connected to one of the respective actuators 60.

The invention thus makes it possible to reduce the number of movement transmission parts, which are in this example formed by six tie rods each connected to the movable element 61 of one of the actuators 60.

The reverser 20 of FIGS. 2 and 3 moreover comprises guiding means 70 of the ring 50 between the forward and retracted positions.

The guiding means 70 are separate from the actuation system.

In this example, the guiding means 70 comprise, for each of the girders 30, two rails 71 mounted on either side of the corresponding girder 30 and two slides 72 rigidly connected to the ring 50 which are configured to each cooperate with one of the respective rails 71 when the ring 50 is moved between the forward and retracted positions.

In one alternative not shown, the guiding means comprise conversely rails rigidly connected to the ring 50 and slides each rigidly connected to one of the girders.

Obviously, the number of rails and slides can be modified without leaving the scope of the invention.

Furthermore, guiding means can be different from those described above.

For example, in one embodiment not shown, the guiding means comprise bearings rigidly connected to the girders 30 and bars rigidly connected to the ring 50 which are configured to each slide in one of the respective bearings when the ring 50 is moved between the forward and retracted positions.

With reference to FIG. 3, the door 40 comprises a locking pin 80 extending circumferentially at the lateral edge 44 and longitudinally at the front end 41 of the door 40. The slide 72 which is positioned at this lateral edge 44 of the door 40 forms a groove 81 having a front end which defines a stop surface facing which the pin 80 extends when the door 40 is closed.

In this example, when the door 40 is closed and the ring 50 is in the forward position, a gap is provided between the pin 80 and said stop surface such that, for example in the event of rupture of the tie rod 63, the ring 50 can translate to the rear by a distance corresponding to this gap then is locked accounting for the cooperation of the pin 80 with the stop surface. The pin 80 and the groove 81 thus form a means for locking the position of the ring 50 and provide an additional load pathway making it possible to guarantee the integrity of the reverser.

The reverser 20 comprises in this example three other equivalent locking means not shown, such that each door 40 is provided with the pin 80 at each of its lateral edges 43 and 44 and each slide 72 comprises a groove 81 forming a corresponding stop surface.

Figure 4:
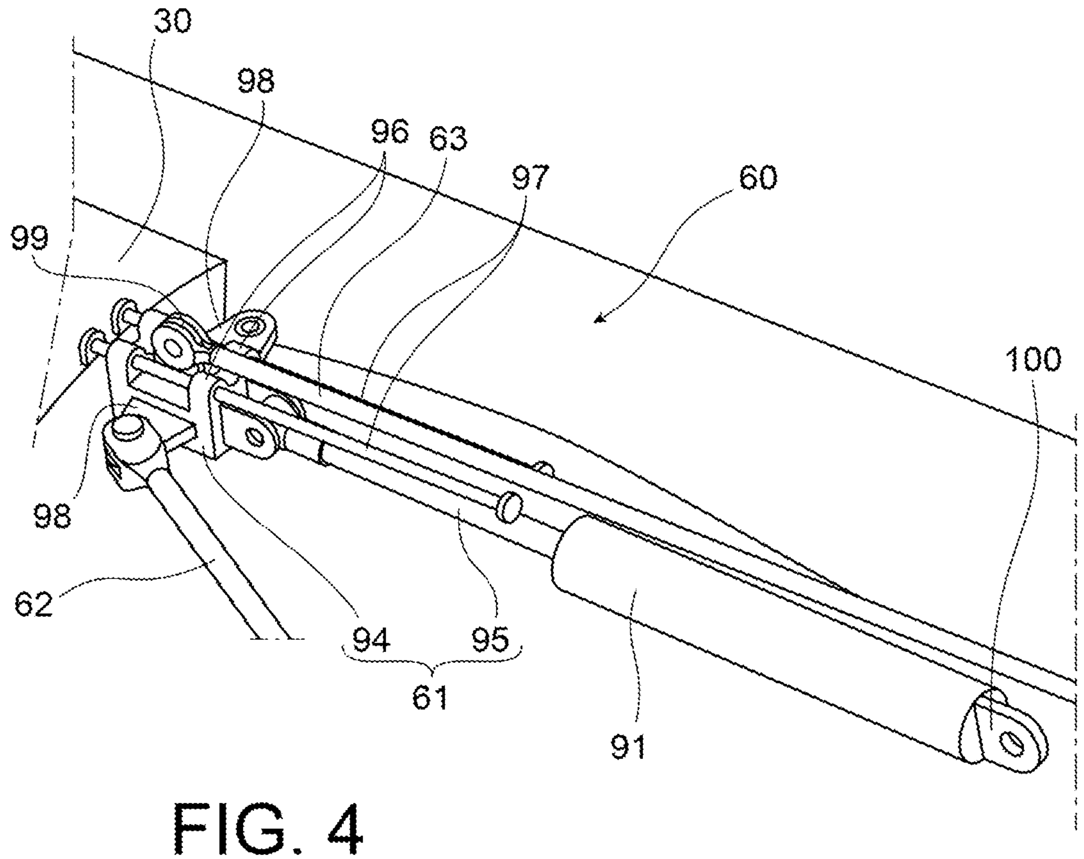
FIG. 4 is a schematic perspective view of a reverser actuator according to a second embodiment of the invention.

The reverser 20 of FIGS. 2 and 3 can comprise different actuators 60 from that described above, for example actuators according to the that of FIG. 4.

Compared to the actuator of FIGS. 2 and 3, the movable element 61 of the actuator 60 of FIG. 4 comprises a carriage 94 connected to a front end of the rod 95 and the actuator 60 is devoid of a slotted tube.

In this example, the carriage 94 comprises bushings 96 receiving rods 97 embedded on the girder 30 and guide the movable element 61 during its movement along the actuation axis.

With reference to FIG. 4, the carriage 94 comprises two lateral lugs 98 to which the two tie rods 62 are hinged and one lug 99 extending between the guide rods 97 and to which the second tie rod 63 is hinged.

The description of FIGS. 2 and 3 above applies by analogy to the embodiment of FIG. 4.

Figure 5:
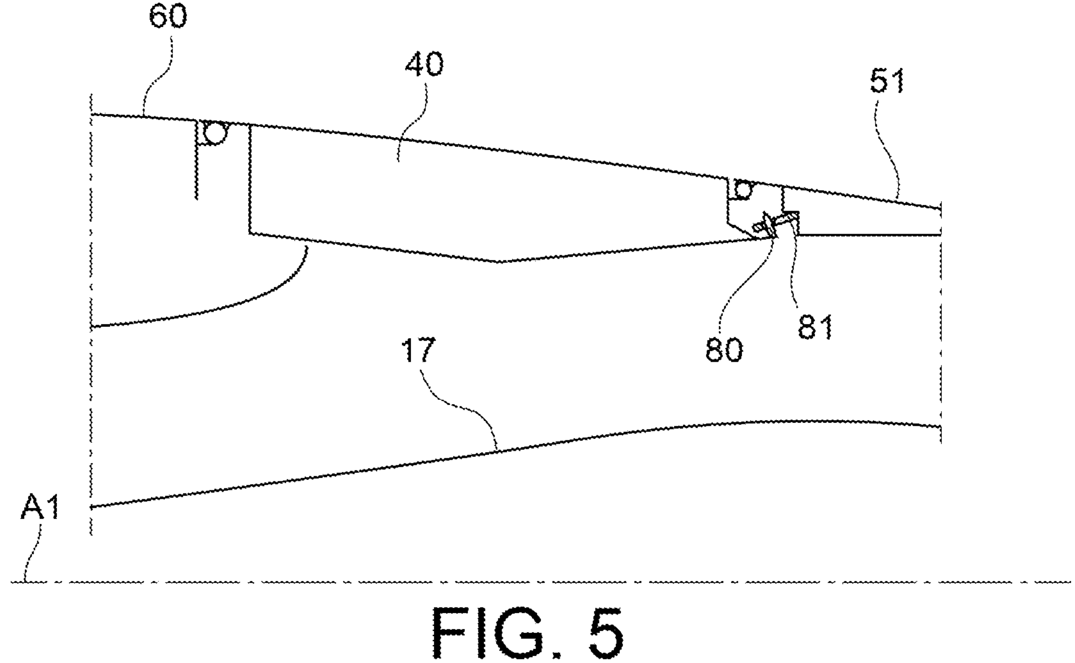
FIG. 5 is a schematic perspective half-view of a thrust reverser according to the invention, in the direct thrust configuration, comprising a second type of locking means.
Figure 6:
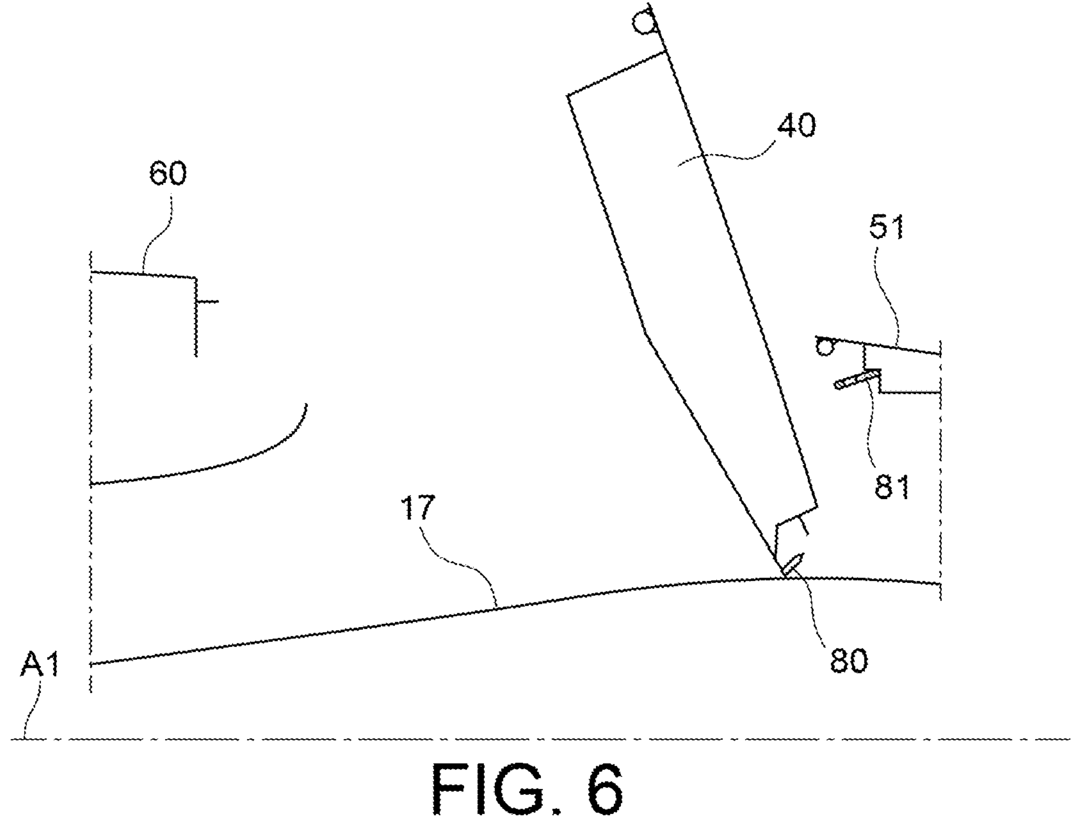
FIG. 6 is a schematic partial sectional view of the reverser of FIG. 5, in the reverse thrust configuration.

FIGS. 5 and 6 illustrate different locking means from those described above.

In the example of FIGS. 5 and 6, each door 40 comprises a locking pin 80 mounted at the rear end of the door 40 and circumferentially at its centre. The rear shell ring comprises, radially below each of the fairing elements 51, a part 81 forming a housing configured to receive the pin 80 and thus lock the position of the ring 50 when the door 40 is closed.

Of course, the invention is not limited to the embodiments described above. For example, the reverser 20 may be traversed by an different internal structure from the exhaust cone 17 or not be traversed by such an internal structure, hence the rear end 42 of the doors 40 can have a different geometry from that illustrated in FIGS. 2 and 3.

In one variant of FIG. 2, not shown, the ring 50 in the forward position bears directly on the rear end 55 of the girders 30, without sealing at the interface of the ring 50 and the rear end 55 of the girders 30. In this variant, it is preferred that the second tie rod 63 be telescopic and/or have a spring in order to improve the interface contact between the ring 50 and the girders 30. Of course, the second tie rod 63 can also be telescopic and/or have a spring in the embodiments of FIGS. 2 to 4.

In one embodiment not shown, the movable element 61 of the actuator 60, which can comprise a different cylinder from those described above, is moved under the action of a motor via power hoses.

The invention can also be implemented in a propulsion unit different from that of FIG. 1, for example in a propulsion unit comprising a single-flow jet engine.

The invention claimed is:

1. A thrust reverser for an aircraft propulsion unit, comprising a fixed structure, a door, a ring forming a trailing edge and intended to be traversed by a fluid flow when the reverser is in a direct thrust configuration, an actuation system configured to simultaneously pivot the door between a closed direct thrust position and an open reverse thrust position and translate the ring between a forward position and a retracted position in relation to the fixed structure, and a guiding device for guiding the ring between the forward and retracted positions, the actuation system comprising:

an actuator provided with a movable drive element, a first tie rod having a first end connected to the movable element of the actuator and a second end connected to the door, a second tie rod having a first end connected to the movable element of the actuator and a second end connected to the ring, wherein an entirety of the ring has an annular shape, wherein the second end of the second tie rod is directly connected to the annular ring, and wherein in the forward position, an entirety of the annular ring is positioned downstream from the first tie rod with respect to a direction of the fluid flow.

2. The thrust reverser according to claim 1, wherein the fixed structure comprises two longitudinal girders, the door extending circumferentially between these girders when it is in the closed position.

3. The thrust reverser according to claim 2, wherein the actuator is mounted on one of the girders.

4. The thrust reverser according to claim 2, wherein the girders comprise a rear end whereon the ring bears when the ring is in the forward position.

5. The thrust reverser according to claim 1, wherein the guiding device comprise bars rigidly connected to the ring and bearings borne by the fixed structure, the bars being configured to slide in the bearings when the ring is moved between the forward and retracted positions.

6. The thrust reverser according to claim 1, wherein the door comprises a rear end defining a parabolic shaped opening intended to conform with an internal structure of the propulsion unit when the door is in the open position, the reverser comprising a fairing element rigidly connected to the ring and having a complementary shape to that of said opening so as to seal between the door and the fairing element when the door is in the closed position.

7. The thrust reverser according to claim 1, wherein the movable element of the actuator comprises a carriage, the first end of the first tie rod and the first end of the second tie rod being connected to the carriage.

8. The thrust reverser according to claim 1, wherein the door comprises a locking pin configured to extend facing a stop surface formed by the ring or by a member rigidly connected to the ring when the door is in the closed position so as to prevent a translation of the ring to the retracted position.

9. The aircraft propulsion unit, comprising the thrust reverser according to claim 1.

10. The propulsion unit according to claim 9, comprising an internal structure, the internal structure being an exhaust cone.

* * * * *